US011877978B2

(12) United States Patent
Smith et al.

(10) Patent No.: US 11,877,978 B2
(45) **Date of Patent: *Jan. 23, 2024**

(54) TRACK AND LIFT REHABILITATION SYSTEMS AND RELATED METHODS

(71) Applicant: REHABILITATION INSTITUTE OF CHICAGO, Chicago, IL (US)

(72) Inventors: Joanne C. Smith, Chicago, IL (US); Mark Witteveen, Chicago, IL (US)

(73) Assignee: REHABILITATION INSTITUTE OF CHICAGO, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/672,213

(22) Filed: Feb. 15, 2022

(65) Prior Publication Data

US 2022/0168168 A1 Jun. 2, 2022

Related U.S. Application Data

(63) Continuation of application No. 16/492,913, filed as application No. PCT/US2018/021963 on Mar. 12, 2018, now Pat. No. 11,285,070.

(Continued)

(51) Int. Cl.
*A61H 3/00* (2006.01)
*A61G 7/10* (2006.01)

(52) U.S. Cl.
CPC .......... *A61H 3/008* (2013.01); *A61G 7/1015* (2013.01); *A61G 7/1025* (2013.01);
(Continued)

(58) Field of Classification Search
CPC .............. A61H 3/008; A61H 2003/001; A61H 2201/1652; A61H 2201/5046;
(Continued)

(56) References Cited

U.S. PATENT DOCUMENTS 3,780,663 A * 12/1973 Pettit .................... A61G 7/1042 119/857
4,243,147 A 1/1981 Twitchell et al.
(Continued)

FOREIGN PATENT DOCUMENTS

DE 203 13 772 U1 11/2003
KR 10-1573840 B1 12/2015
(Continued)

OTHER PUBLICATIONS

Search Report issued in related application EP 18763331.8, dated Dec. 14, 2020, 8 pages.
(Continued)

*Primary Examiner* — Andrew S Lo
*Assistant Examiner* — Andrew M Kobylarz
(74) *Attorney, Agent, or Firm* — Faegre Drinker Biddle & Reath LLP

(57) ABSTRACT

A system for physical rehabilitation is disclosed. The system comprises a plurality of motors configured to be coupled to a ceiling, and a plurality of cable portions. Each cable portion is connected at a first end to a motor, among the plurality of motors, and connected at a second end to a connector element for attaching to a patient. The system also comprises a controller in operative communication with the plurality of motors to move the connector element in relation to a staircase. The controller is configured to adjust one or both of position and speed of the connector element based on tracked kinematics of the patient as the patient moves along the staircase.

23 Claims, 6 Drawing Sheets

Related U.S. Application Data

(60) Provisional application No. 62/470,148, filed on Mar. 10, 2017.

(52) U.S. Cl.
CPC ......... *A61G 7/1042* (2013.01); *A61G 7/1051* (2013.01); *A61G 7/1061* (2013.01); *A61G 2200/36* (2013.01); *A61G 2203/14* (2013.01); *A61G 2203/36* (2013.01); *A61H 2003/001* (2013.01); *A61H 2201/1652* (2013.01); *A61H 2201/5046* (2013.01); *A61H 2201/5097* (2013.01)

(58) Field of Classification Search
CPC .... A61H 2201/5097; A61H 2201/5023; A61H 2201/5064; A61H 2201/5079; A61G 7/1015; A61G 7/1025; A61G 7/1042; A61G 7/1051; A61G 7/1061; A61G 2200/36; A61G 2203/14; A61G 2203/36; A61G 2203/40; A61G 2203/72; A61G 7/1044
See application file for complete search history.

(56) References Cited

U.S. PATENT DOCUMENTS

| | | | | |
|---|---|---|---|---|
| 7,883,450 | B2 * | 2/2011 | Hidler | A61H 3/008 212/346 |
| 9,089,465 | B2 | 7/2015 | Galloway et al. | |
| 9,801,775 | B2 * | 10/2017 | Vallery | A63B 21/4009 |
| 11,285,070 | B2 * | 3/2022 | Smith | A61G 7/1044 |
| 2004/0221388 | A1 * | 11/2004 | Votel | A61G 7/1084 5/81.1 R |
| 2007/0171199 | A1 * | 7/2007 | Gosselin | G06F 3/016 345/156 |
| 2014/0075669 | A1 * | 3/2014 | Andersson | A61G 7/1051 192/76 |
| 2014/0201905 | A1 * | 7/2014 | Glukhovsky | A61G 7/1042 5/81.1 R |
| 2014/0342877 | A1 | 11/2014 | Rakhmatullin et al. | |
| 2015/0107020 | A1 * | 4/2015 | Andersson | A61G 7/1015 5/83.1 |
| 2015/0320632 | A1 * | 11/2015 | Vallery | A61G 7/1042 482/69 |

FOREIGN PATENT DOCUMENTS

| | | | |
|---|---|---|---|
| WO | 2015/107020 | A1 | 7/2015 |
| WO | 2015/164421 | A1 | 10/2015 |
| WO | 2017/005661 | A1 | 1/2017 |
| WO | 2018/033591 | A2 | 2/2018 |
| WO | 2018/165651 | A1 | 9/2018 |

OTHER PUBLICATIONS

International Search Report and Written Opinion issued in related application PCT/US2018/021963, dated Jun. 6, 2018, 9 pages.
Examination Report issued for related application SA 519410074, dated Jul. 21, 2022, with English language translation, 21 pages.
Examination Report issued for related application KW/PCT/2019/307, dated Jan. 5, 2023, 5 pages.
Examination Report issued for related application EP 18763331.8, dated Aug. 3, 2023, 7 pages.

* cited by examiner

TRACK AND LIFT REHABILITATION SYSTEMS AND RELATED METHODS

CROSS-REFERENCE TO RELATED APPLICATIONS

This application is a continuation of U.S. patent application Ser. No. 16/492,913, filed Sep. 10, 2019, which is a U.S. National Phase of International Patent Application No. PCT/US2018/021963, filed Mar. 12, 2018, which claims priority to U.S. Provisional Patent Application No. 62/470,148, filed Mar. 10, 2017, entitled "Track and Lift Rehabilitation Systems and Related Methods." The disclosures of each of the above-listed applications are incorporated herein by reference in their entirety.

FEDERALLY SPONSORED RESEARCH OR DEVELOPMENT

None.

TECHNICAL FIELD

The present disclosure is generally directed to systems and methods of physical rehabilitation and, more particularly, to staircase gait systems for physical rehabilitation and related methods.

BACKGROUND

People who suffer from a spinal cord injury, a stroke, or another physical condition can benefit from physical therapy. One type of task a patient may perform during physical therapy is gait training, where the patient practices walking, often with the help of a physical therapist.

The type of therapy a stroke patient receives can have a significant impact on his or her ability to recover. Recent research suggests that simply walking on a flat treadmill can limit the extent of the patient's recovery, and that training with variable challenges, such as requiring the patient to step in multiple directions, over obstacles, or up and down stairs, can help improve recovery.

However, gait training that requires a variety of challenging locomotor tasks can be discouraged in a rehabilitation setting. Post-stroke patients can have many gait impairments, and often cannot climb staircases during therapy out of safety concerns. Some physical therapists physically assist patients up and down staircases during therapy. However, successfully providing this kind of therapy for many patients in a day is strenuous for the therapist and increases the risk of fall and injury.

BRIEF SUMMARY

In an embodiment, a system for physical rehabilitation is provided. The system comprises a plurality of motors configured to be coupled to a ceiling and a plurality of cable portions, wherein each cable portion is connected at a first end to a motor, among the plurality of motors, and connected at a second end to a connector element, wherein the connector element is for attaching to a patient. The system also comprises a controller in operative communication with the plurality of motors to move the connector element in relation to a staircase, wherein the controller is configured to adjust one or both of i) position and ii) speed of the connector element based on tracked kinematics of the patient as the patient moves along the staircase.

In another embodiment, another system for physical rehabilitation is provided. The system comprises a plurality of motors configured to be coupled to a ceiling and a plurality of cable portions, wherein each cable portion is connected at a first end to a motor and connected at a second end to a connector element, the connector element comprising a ball having a plurality of holes through which the cable portions may be threaded to secure the ball thereto. The system also comprises a main controller in operative communication with the plurality of motors to move the connector element so that the connector element moves along with a patient.

BRIEF DESCRIPTION OF THE SEVERAL VIEWS OF THE DRAWINGS

Various embodiments are described herein by way of example in conjunction with the following figures.

DETAILED DESCRIPTION

Figure 1:
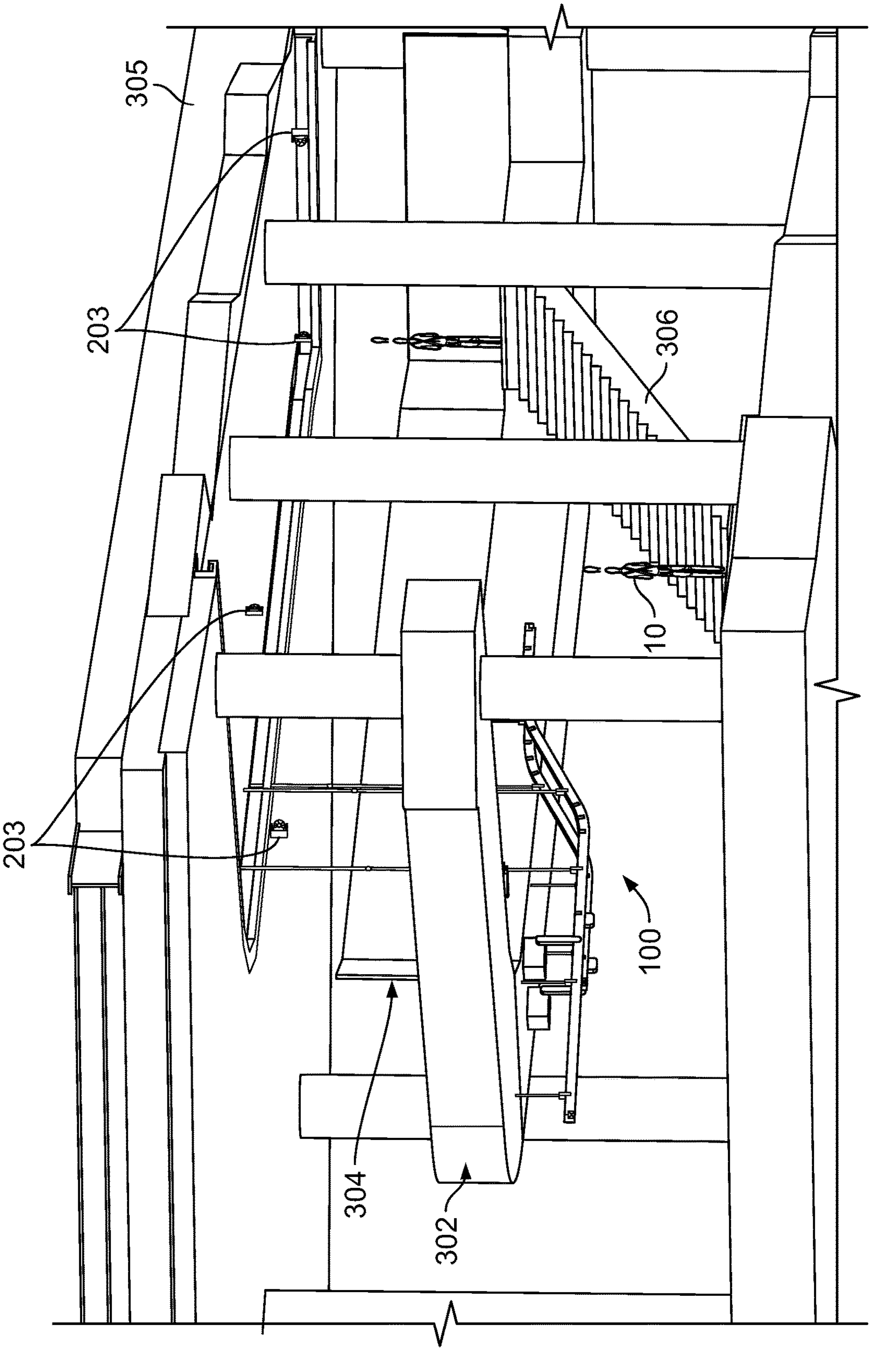
FIG. 1 displays a view of an exemplary rehabilitation support system.

FIG. 1 displays a representation of a rehabilitation support system. As shown in FIG. 1, the rehabilitation support system comprises a track system 100 and a lift system 200. The lift system 200 may comprise a plurality of motor points 203, a plurality of motors 202, cables 204, a plurality of motor controllers, and a main controller 260. The motors 202 may each have a finished weight of approximately 400 pounds, and so may be bolted or otherwise secured appropriately to or within the ceiling 305.

The track system 100 may be attached to a balcony 302 or other support. A railing 304 may surround the system. A patient 10 may be placed into a harness 12 that is attachable to the track system 100 and the lift system 200. The patient 10 walks beneath track system 100. Upon reaching the end of the track system 100, the patient's harness 12 may be detached from the track system 100 and attached to the lift system 200. The lift system 200 provides support as the patient 10 ascends the stairs 306. The patient may reach the top landing of the stairs 306, turn around, and descend the stairs 306, still with the support of the lift system 200.

Figure 2:
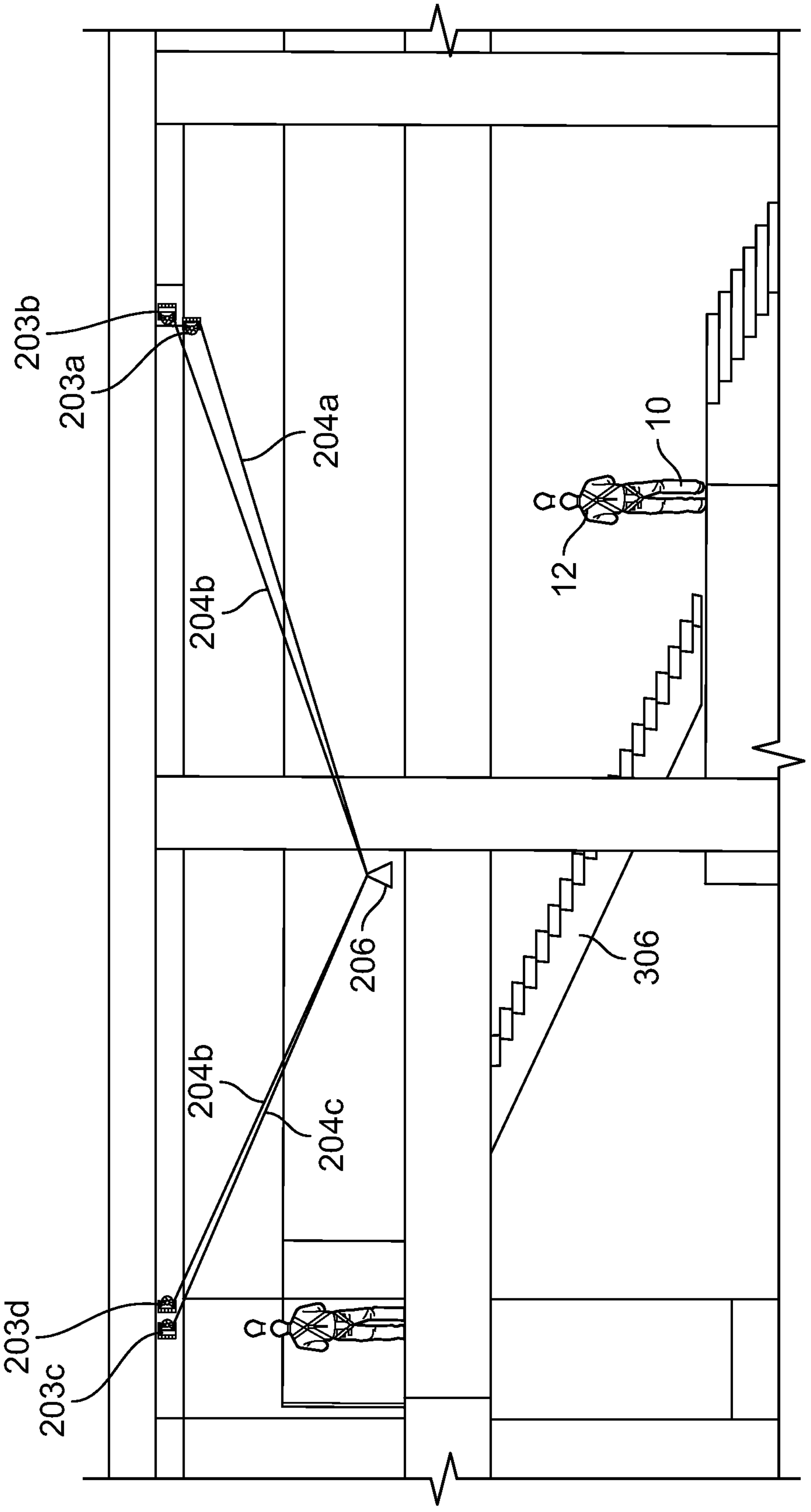
FIG. 2 displays a side view of an exemplary lift system.

FIG. 2 displays a side view of the lift system 200. The cables 204 may be made of wire, a synthetic material, or another suitable material. Cables 204 can extend from each motor 202, along a motor point 203, and meet at a connector element 206. The connector element 206 may connect to a support bar 208 that connects to a harness 12 worn by the patient 10. Alternately, the support bar 208 may be integrated into the connector element 206. The lift system adjusts the position of the connector element 206 relative to the stairs 306. The connector element 206 may be raised above the stairs 306 or lowered towards the stairs 306. The connector element 206 may move in a pre-determined path above the stairs 306. In one embodiment, a joystick can be used to control the position of the connector element 206. The joystick may be in operative communication with the lift system 200 by wired or wireless means, such as Bluetooth. In another embodiment, the user controller may comprise a touch screen. In other embodiments, cameras may be positioned in the areas surrounding the lift system 200 that can track the position of the patient 10. For example, the harness 12 worn by the patient 10 may comprise a light emitting diode (LED) or other tracking device. The cameras can identify the location of the tracking device on the patient and then track the direction and speed of the patient as he or she moves along the stairs 306. The lift system 200 may then adjust the position and speed of the connector element 206 so that the connector element 206 moves with the patient.

Figure 3:
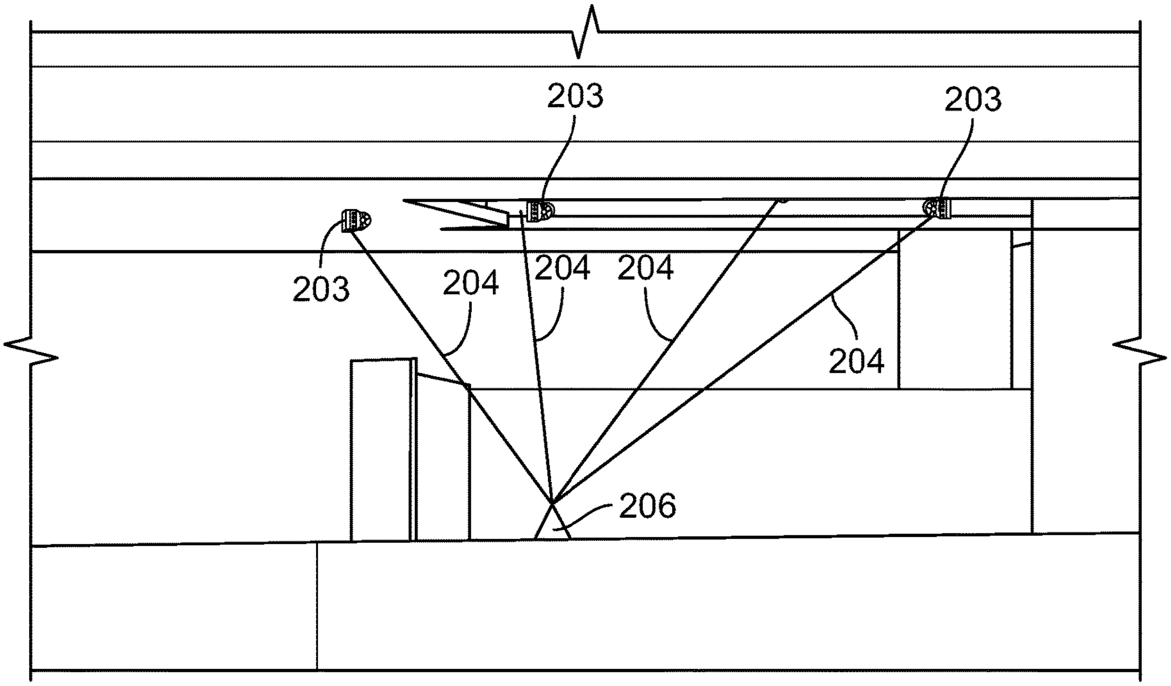
FIG. 3 displays another side view of the lift system.
Figure 4:
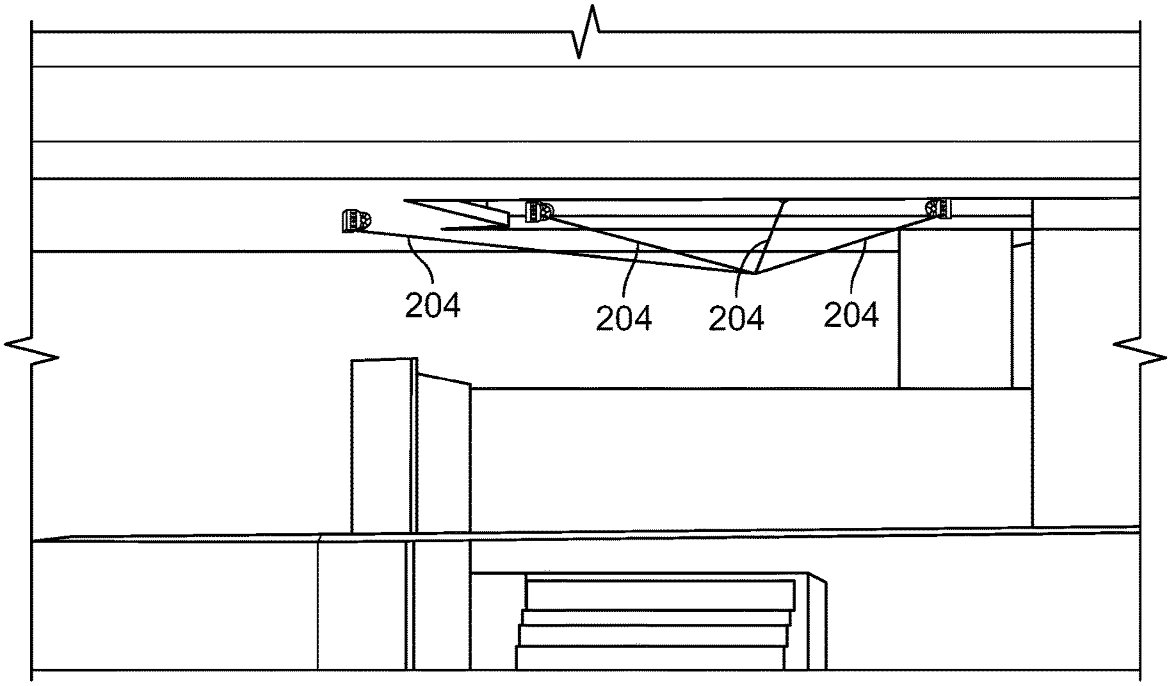
FIG. 4 displays another side view of the lift system.

FIG. 3 displays a side view of the lift system 200 when the lift system 200 is in a lowered position. FIG. 4 displays a side view of the lift system 200 when the lift system 200 is in a raised position. This raised position can be useful when the lift system 200 is not in use, and the cables 204 are moved close to the ceiling 305.

Figure 5:
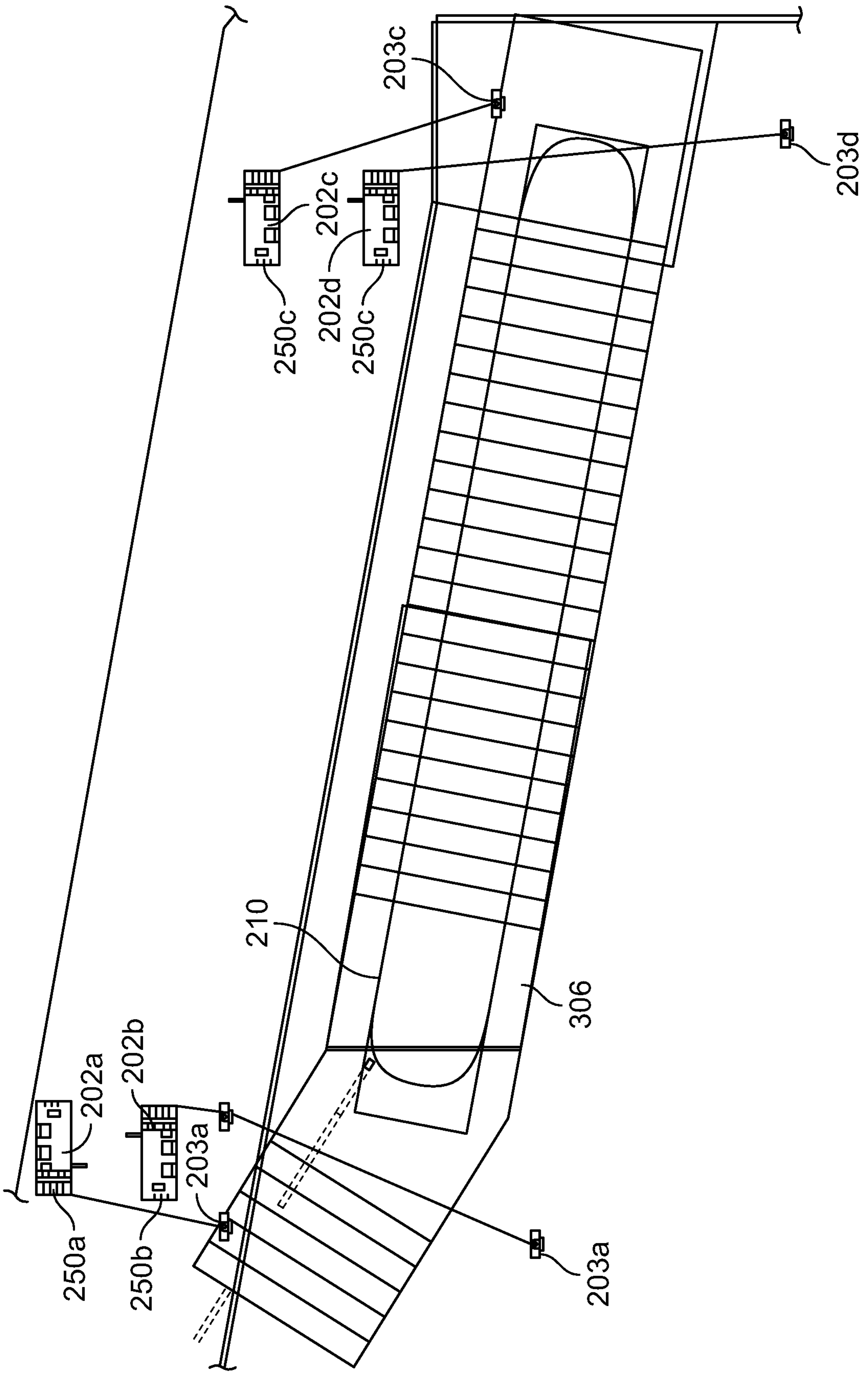
FIG. 5 displays a top view of the lift system.
Figure 6:
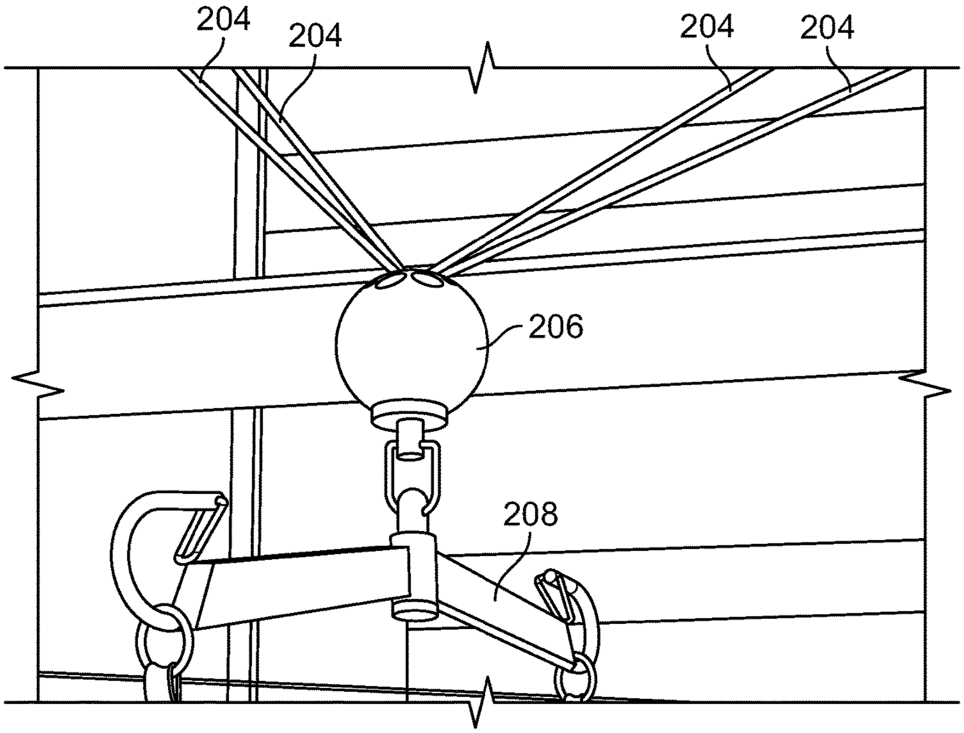
FIG. 6 displays an embodiment of a connector element.
Figure 7:
FIG. 7 displays another view of an embodiment of a connector element.
Figure 8:
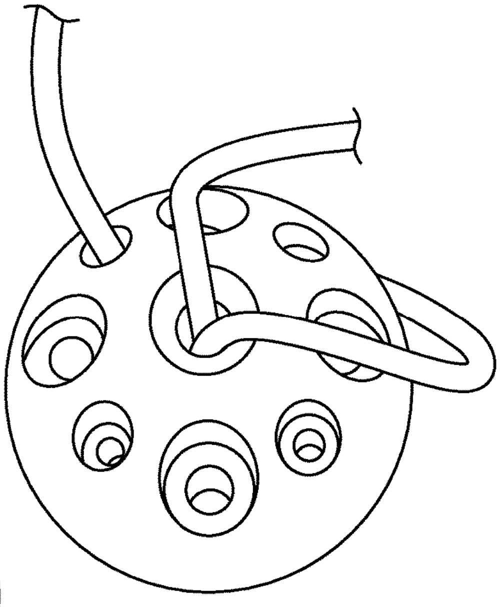
FIG. 8 displays a top view of a portion of an embodiment of a connector element.
Figure 9:
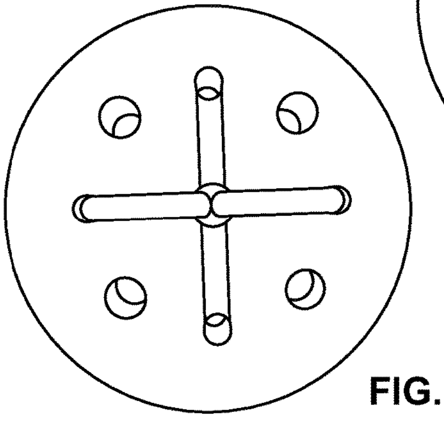
FIG. 9 displays a bottom view of the portion shown in FIG. 8.

FIG. 5 displays a top view of the lift system 200. Each motor 202 is associated with a motor controller 250, a motor point 203, and a cable portion 204*a*. For example, motor 202*a* is associated with motor controller 250*a,* motor point 203*a,* and cable portion 204*a.* The motor controller 250*a* sends instructions to the motor 202*a* to adjust the length of the cable portion 204*a,* in order to lengthen or shorten the cable portion 204*a*. Appropriate adjustment of the length of cable portions 204*a,* 204*b,* 204*c,* and 204*d* result in the connector element 206 being moved to the desired position. FIG. 5 also displays a travel path 210, which reflects the path above the stairs 306 along which the connector element 206 may travel.

The connector element 206 may take many different forms. In one embodiment, shown in FIGS. 6-9, the connector element 206 comprises a ball comprising a plurality of holes. The cables 204 may be threaded through openings in the ball in order to secure the ball to the cables 204. The ball may be separable into a plurality of portions to make it easier to thread the cable. The connector element 206 may be connected to a support bar 208 onto which a patient harness 12 may be attached.

In an embodiment, the lift system 200 may be configured to carry a maximum load of 400 pounds, in order to accommodate heavy patients.

A rehabilitation facility may comprise a plurality of lift systems 200, such that two or more patients may use the system at a time on the same stairs 306.

Figure 10:
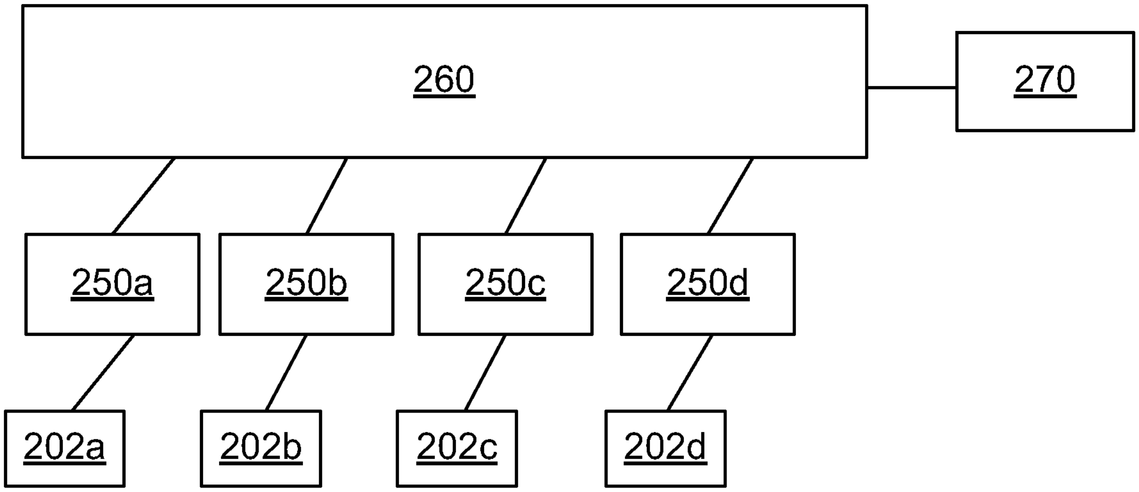
FIG. 10 displays a representation of certain components of an exemplary lift system.

FIG. 10 is a representation of various components of the lift system 200. In an embodiment, each motor 202*a,* 202*b,* 202*c,* 202*d* is in operative communication with a motor controller 250*a,* 250*b,* 250*c,* 250*d.* Each motor controller 250*a,* 250*b,* 250*c,* 250*d* may in turn be in operative communication with a main controller 260. The main controller 260 can direct the instructions that each motor controller 250*a,* 250*b,* 250*c,* 250*d* provides to its respective motor 202*a,* 202*b,* 202*c,* 202*d.* A user controller 270 provides instructions to the main controller 260. The user controller 270 may take several embodiments. For example, the user controller 270 may be a joystick. As another example, the user controller 270 could comprise a plurality of cameras that are designed to track the position, speed, and/or other kinematics of the patient 10 on the stairs 306. The user controller 270 may be configured to communicate with the rack controller in such a way as to indicate the desired position of the connector element 206. For instance, the user controller 270 give a command to the main controller 260 indicating that the connector element should move left or right; should move up the stairs 306 or down the stairs 306; should be raised above or lowered towards the stairs 306; or should stop. The user controller 270 may give a dead man command or a synch command. Additionally, the user controller 270 may give a command to change the mode of the lift system 200.

The connector element 206 may move at a variable speed up to a maximum speed, in response to commands or other signals from the user controller 270. In a preferred embodiment, the maximum speed is two feet per second. The speed of the connector element 206 may be increased or decreased without having to first stop the connector element 206.

The main controller 260 may be programmed with various algorithms to assist in the proper operation of the lift system 200. For example, a tension algorithm may be provided to indicate the load on each cable portion 204*a,* so that load on each motor 202 is kept within appropriate limits. A load algorithm may calculate the physical load on each motor 202 and transmit that information to the main controller 260. An angle algorithm may be further provided to calculate the three dimensional point of the connector element 206 in relation to each motor 202 and/or motor point 203.

The lift system 200 may employ various modes. For example, the main controller 260 may toggle between a horizontal mode, a vertical mode, or a path mode. In horizontal mode, the lift system 200 operates such that the connector element 206 can be moved to the left, to the right, up the stairs 306 and down the stairs 306. In vertical mode, the lift system 200 operates such that the connector element 206 can move up, away from the stairs 306 or down, towards the stairs 306. In a path mode, the lift system 200 operates such that the connector element 206 can move along a pre-determined path. One or more pre-determined paths may be programmed into the main controller 260. In a path mode, connector element 206 moves along a pre-determined path. In an embodiment, in path mode, the connector element 206 travels around a loop, such as an oval loop. Other paths, such as squares, rectangles, lines, or a combination thereof, may also be programmed into the main controller 260. Various paths may be programmed into the main controller 260, or otherwise may be pre-determined (in other words, the path of the connector element 206 may be determined prior to the patient 10 using the lift system 200). The lift system 200 may also employ a fault mode, where if the main controller 260 indicates a problem or error with the system. Examples of problems or errors include, for instance, if the tension on a cable 204 is too great. In such an instance, the lift system 200 may be configured to stop and/or return to a default position, as appropriate. For example, in fault mode the lift system 200 may lower the patient 10 to the staircase level at the point of stoppage.

The parent controller may calculate the limits of the position and speed of the connector element 206 based on known limits of its position and speed. The main controller 260 may compute control and position algorithms for each motor controller 250, which in turn will cause the motor controller 250 to appropriately control its respective motor 202. This will result in correct positioning of the connector element 206. In an embodiment, the main controller 260 converts the three-dimensional position of the connector element to linear control of length of each cable portion 204*a*. The main controller 260 can be configured to account for the height of a patient 10.

When used in rehabilitation, such as gait therapy, the lift system 200 can serve many different purposes. In one example, it can be used so that it provides no lift support while the patient is walking. If the patient falls, lift system 200 stops the patient from falling to the floor and suffering a fall injury. The cables 204 and the connector element 206 support the weight of the patient if the patient slips or falls. In another example, the lift system 200 can actually lift the patient off of the staircase. This can be useful, for instance, if the patient walks up a portion of the staircase but is unable to walk safely down the steps to return to the bottom of the stairs.

What is claimed is:

1. A system for physical rehabilitation, comprising:

a plurality of motors configured to be coupled to a ceiling;

a plurality of cable portions, wherein each cable portion is connected at a first end to a motor and connected at a second end to a connector element, wherein the connector element is for attaching to a patient;

a controller in operative communication with the plurality of motors to move the connector element in relation to a staircase; and one or more tracking devices configured to track kinematics of the patient as the patient moves along the staircase, wherein the one or more tracking devices include a first tracking device that moves with the patient as the patient moves along the staircase and one or more second tracking devices configured to identify a location of the first tracking device that moves with the patient and track kinematics of the patient based on the identified location of the first tracking device, and wherein the controller is configured to adjust one or both of i) position and ii) speed of the connector element based on the tracked kinematics of the patient tracked by the one or more tracking devices as the patient moves along the staircase.

2. The system of claim 1, wherein the one or more tracking devices are configured to track one or more of i) position, ii) direction and iii) speed of the patient as the patient moves along the staircase.

3. The system of claim 1, wherein the first tracking device is attached to a harness coupled to the connector element.

4. The system of claim 1, wherein the first tracking device comprises a light emitting diode.

5. The system of claim 1, wherein the one or more second tracking devices comprise a plurality of cameras.

6. The system of claim 1, wherein the controller is configured to control operation of the plurality of motors to move the connector element in one or more of i) an upward direction away from the staircase, ii) a downward direction towards the staircase, iii) a left edge of the staircase and iv) a right edge of the staircase.

7. The system of claim 1, wherein the controller is configured to control operation of the plurality of motors to move the connector element i) in an upward direction as the patient moves up the staircase at a first time during a rehabilitation session and ii) in a downward direction as the patient moves down the staircase at a second time during the rehabilitation session.

8. The system of claim 1, wherein the controller is configured to control operation of the plurality of motors to move the connector element along a predetermined path in relation to the staircase.

9. The system of claim 7, wherein the predetermined path is the shape of one of i) an oval and ii) a line segment.

10. The system of claim 1, wherein operation of each of the plurality of motors adjusts a length of each of the cable portions in order to move a position of the connector element in relation to the staircase.

11. The system of claim 1, wherein the controller is configured to control operation of the plurality of motors to move the connector element at a variable speed up to a maximum speed as the connector element moves in relation to the staircase.

12. A system for physical rehabilitation, comprising:

a plurality of motors configured to be coupled to a ceiling;

a plurality of cable portions, wherein each cable portion is connected at a first end to a motor and connected at a second end to a connector element, the connector element comprising a ball having a plurality of holes through which the cable portions may be threaded to secure the ball thereto; and a main controller in operative communication with the plurality of motors to move the connector element so that the connector element moves along with a patient.

13. The system of claim 12, wherein the main controller is configured to move the connector element relative to a staircase as the patient moves along the staircase.

14. The system of claim 13, wherein the main controller is configured to control operation of the plurality of motors to move the connector element in one or more of i) an upward direction away from the staircase, ii) a downward direction towards the staircase, iii) a left edge of the staircase and iv) a right edge of the staircase.

15. The system of claim 13, wherein the main controller is configured to control operation of the plurality of motors to move the connector element i) in an upward direction as the patient moves up the staircase at a first time during a rehabilitation session and ii) in a downward direction as the patient moves down the staircase at a second time during the rehabilitation session.

16. The system of claim 12, further comprising a user controller, wherein the user controller is in operative communication with the main controller to send commands to the main controller.

17. The system of claim 16, wherein the user controller is configured to track kinematics of the patient and instruct the main controller to adjust one or both of i) position and ii) speed of the connector element based on the tracked kinematics of the patient.

18. The system of claim 16, wherein the user controller is configured to track one or more of i) position, ii) direction and iii) speed of the patient as the patient moves.

19. A method for physical rehabilitation, comprising:

attaching a harness worn by a patient to a connector element of a track and lift system, wherein the connector element is connected to at least one cable portion, comprises a ball having at least one hole through which the at least one cable portion is threaded to secure the ball thereto, and is adapted to move with the patient as the patient moves along a travel path;

tracking kinematics of the patient as the patient moves along the travel path; and adjusting one or both of i) position and ii) speed of the connector element based on the tracked kinematics of the patient as the patient moves along the travel path.

20. The method of claim 19, wherein the at least one cable portion comprises a plurality of cable portions, each of which is connected at a first end to a motor and connected at a second end to the connector element, further comprising:

operating a controller in operative communication with the motor to move the connector element, wherein the controller is configured to adjust one or both of the i) position and ii) speed of the connector element based on the tracked kinematics of the patient as the patient moves along the travel path.

21. The method of claim 20, wherein operating the controller to move the connector element comprises:

operating the controller to control operation of the motor to move the connector element in one or more of i) an upward direction as the patient moves up a staircase, and ii) a downward direction as the patient moves down the staircase.

22. The method of claim 20, wherein operating the controller to move the connector element comprises:

operating the controller to control operation of the motor to move the connector element along a predetermined path in relation to a staircase.

23. The method of claim 20, wherein operating the controller to move the connector element comprises:

operating the controller to control operation of the motor to adjust a length of each of the cable portions in order to move a position of the connector element.

* * * * *